A. F. TARR.
Clothes-Line Poles.
No. 156,446. Patented Nov. 3, 1874.
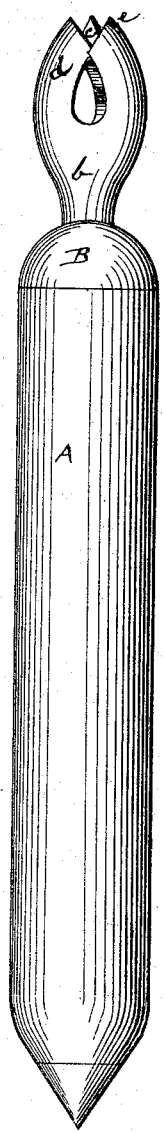
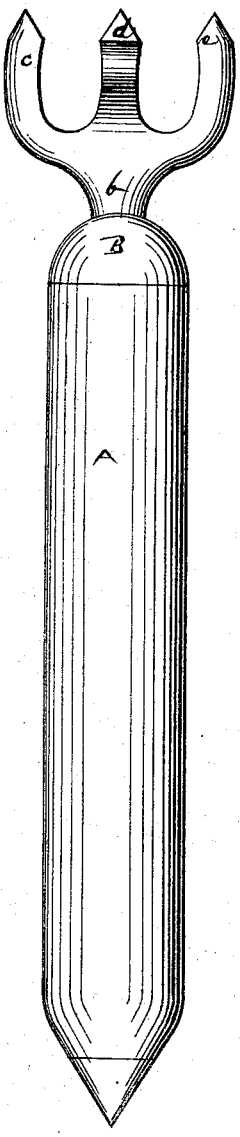

UNITED STATES PATENT OFFICE.

ASA. F. TARR, OF ROCKPORT, MASSACHUSETTS.

IMPROVEMENT IN CLOTHES-LINE POLES.

Specification forming part of Letters Patent No. 156,446, dated November 3, 1874; application filed May 20, 1874.

*To all whom it may concern:*

Be it known that I, ASA F. TARR, of Rockport, Essex county and State of Massachusetts, have invented a new and Improved Clothes-Pole; and I hereby declare the following to be a full, clear, and exact description thereof, reference being had to the accompanying drawings making part of this specification, in which—

Figure 1 is a side elevation, showing my improvements. Fig. 2 is a perspective view from the rear.

The object of my invention is to provide a clothes-pole which will not slip along the clothes-line; and it consists in applying to the upper end of the pole a peculiarly-constructed head having three tines projecting from it, arranged and located as more fully hereinafter set forth.

In order that those skilled in the art may make and use my invention, I will proceed to describe the manner in which I have carried it out.

In the said drawings, A is a pole, having fitted on its end the cap or head B. Projecting upward from this cap is a neck, $b$, from which project three tines, $c\ d\ e$, the lines of connection between them being curved and rounded, to prevent chafing of the rope. The tines $c$ and $e$ are in a line, and the middle tine, $d$, is set out of line, as shown, and has its front edge slightly curved and rounded.

When the line is to be raised it is passed in between the tines $c\ d$, and then bent and passed out between the tines $d\ e$. This bend gives friction enough to prevent the head sliding along the line.

While the springs which have heretofore been used to hold the clothes-line have held the line to the pole, yet from their construction the line could readily slip through them. Hence, when a pole worked loose at its bottom it was liable to fall over, and by its weight bear down the line.

It is evident from the construction of my pole the line is kept from slipping by friction between the tines, and the pole cannot fall so as to press down the line.

I am aware that clothes-poles have heretofore been constructed with devices on their ends to clasp the rope. This I do not claim, broadly; but

Having thus described my invention, what I claim as new, and desire to secure by Letters Patent, is—

The head B, having the three tines, constructed as described, in combination with pole A, as set forth.

ASA F. TARR.

Witnesses:
JOHN W. CLARK,
ASA TARR.